2,999,835
Patented Sept. 12, 1961

2,999,835
RESINOUS MIXTURE COMPRISING ORGANO-POLYSILOXANE AND POLYMER OF A CARBONATE OF A DIHYDRIC PHENOL, AND PRODUCTS CONTAINING SAME

Eugene P. Goldberg, Glens Falls, N.Y., assignor to General Electric Company, a corporation of New York
No Drawing. Filed Jan. 2, 1959, Ser. No. 784,433
7 Claims. (Cl. 260—42)

This invention relates to polycarbonate-polysiloxane resin mixtures or alloys having desirable physical, chemical and electrical properties, and to their preparation. More particularly, it relates to such compositions containing as a constituent part thereof dihydric phenol-derived carbonate units in which the carbonate group is directly attached to a carbon atom of an aromatic ring, said polycarbonate compositions being modified by the addition of organopolysiloxane material.

Various types of polycarbonate resins are known, among which are those prepared by the ester interchange of carbonate esters with glycols, and by the reaction of dihydroxymonoaryl compounds such as hydroquinone and resorcinol with phosgene or carbonate esters. However, they have not generally proven useful because of chemical and physical property deficiencies.

Briefly stated, the compositions of this invention comprise carbonate polymers or resins containing structural units derived from dihydric phenols, the carbonate groups attached directly to the carbon atom of an aromatic ring, said polymers having added thereto from about 0.1% to about 20% by weight of an organopolysiloxane, based on the weight of the carbonate polymer.

Any dihydric phenol compound is useful for the preparation of resins required in the practice of this invention, such dihydric phenol being defined as a monoaryl or polyaryl phenol type material in which the hydroxyl groups are attached directly to aromatic ring carbon atoms. The dihydric phenol compounds used in connection with the invention can typically be represented by the general formula (I)     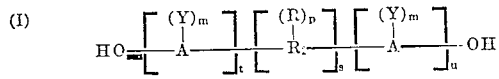

where R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene and alkylidene group such as methylene, ethylene, propylene, propylidene, isopropylidene, butylene, butylidene, isobutylidene, amylene, isoamylene, amylidene, isoamylidene, cyclohexylidene, etc. $R_2$ can also be a silane radical or can be polyalkoxy, such as polyethoxy, polypropoxy, polythioethoxy, polybutoxy, polyphenylethoxy, or polyorganosiloxy, for example, polydimethylsiloxy, polydiphenylsiloxy, polymethylphenylsiloxy, etc. $R_2$ can also consist of two or more alkylene or alkylidene groups such as above, separated by an aromatic group, a tertiary amino group, an ether linkage, a carbonyl group, silane or siloxy group, or by a sulfur-containing group such as sulfide, sulfoxide, sulfone, etc. $R_2$ may also be a glycol dibasic acid ester residue derived from, for example, dibasic acids such as adipic, azelaic, sebacic, isophthalic, terephthalic and alkyl or aryl glycols. Other groupings which can be represented by $R_2$ will occur to those skilled in the art. A is an aromatic ring nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from 0 to 1, $t$ and $u$ are whole numbers including zero. When $s$ is zero, however, either $t$ or $u$ may be zero, and not both.

For the dihydric phenol compound, the substituents Y may be the same or different as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents, such as a nitro group, can be represented by Y. Where $s$ is zero in Formula I, the aromatic rings are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (bisphenol-A);
2,4'-dihydroxydiphenylmethane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1,3-bis-(phenyl)-propane;
2,2-bis-(4-hydroxyphenyl)-1-phenylpropane;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones, such as those set forth in application Serial No. 613,817 filed October 4, 1956, assigned to the same assignee as this invention, are also useful, as bis-(4-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 3'-chloro-4,4'-dihydroxydiphenyl sulfone; bis-(4-hydroxyphenyl) biphenyl disulfone, etc. The preparation of these and other useful sulfones is described in Patent 2,288,282—Huissmann. Polysulfones as well as substituted sulfones using halogen, nitrogen, alkyl radicals, etc. are also useful. Dihydroxy aromatic ethers such as those set forth in application Serial No. 598,768 filed July 19, 1955, assigned to the same assignee as this invention, are also useful. Methods of preparing such materials are found in Chemical Reviews, 38, 414–417 (1946) and Patent 2,739,171—Linn. Exemplary of such dihydroxy aromatic ethers are 4,4'-dihydroxydiphenyl ether;
4,4'-dihydroxytriphenyl ether;
the 4,3'-4,2'-, 3,3'-, 2,2'-2,3'-, etc. dihydroxydiphenyl ethers;
4,4'-dihydroxy-2,5-dimethyldiphenyl ether;
4,4'-dihydroxy-2,6-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4'-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such materials are considered to be included.

When a carbonate ester is used in the preparation of the polycarbonate material which is to be modified, the ingredients are reacted at temperatures from about 150° C. to 300° C. or higher for times varying from 1 to 15 or more hours. Under such conditions, an ester interchange occurs between the carbonate ester and the dihydric phenol compound. The ester interchange is advantageously carried out at reduced pressures of around 10 to 100 mm. of mercury, preferably in an inert atmosphere such as of nitrogen, helium, argon, krypton, etc. to prevent undesirable oxidative effects, especially where higher reaction temperatures are used under moderate subatmospheric pressures. Heating under vacuum after the ester interchange is substantially complete (vacuum cooking), for example, at from about 150° C. to 300° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides, etc. Additional catalysts and variations in the ester exchange methods are discussed in Groggins' "Unit Processes in Organic Synthesis" (4th edition, McGraw-Hill Book Company, 1952), pages 616 to 620. The amount of such catalyst is usually quite small and is of the order of 0.001 to 0.1 percent, by weight, based on the total weight of the reactants.

The diaryl carbonates useful in this connection can be represented by the general formula (II)

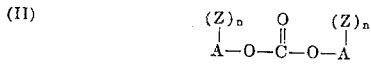

where A is an organic residue in the same sense as in Formula I, Z is an inorganic or organic radical in the same sense as Y of Formula I, and $n$ is an integer. Examples of carbonate esters comprise symmetrical carbonates, for example, diphenyl carbonate, di-(halophenyl) carbonates, e.g., di-(chlorophenyl) carbonate, di-(bromophenyl) carbonate; di-(polyhalophenyl) carbonates, e.g., di-(trichlorophenyl) carbonate, di-(tribromophenyl) carbonate, etc.; di-(alkylphenyl) carbonates, e.g., di-(tolyl) carbonate, etc., di-(naphthyl) carbonate, di-(chloronaphthyl) carbonate, etc., unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holiman et al., Rec. Trav. Chem. 36, 271 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl, ditolyl, and dinaphthyl carbonates by passing phosgene through a column of the phenol in the presence of a catalyst, etc.

The siloxane can be added directly to the reaction mixture when the ester exchange method of preparing the polycarbonate is used. In this connection, the siloxane is useful in plasticizing the various polymers, thus making them easier to handle.

Employing the above method of preparing the polycarbonate polymers by ester interchange using a vacuum cook, the products in the final stages of the reaction become quite viscous and difficult to handle. I therefore prefer generally to carry out the reaction using phosgene or phosgene-like dibasic acid halide in an organic basic material such as a tertiary amine (e.g., pyridine, dimethylaniline, quinoline, etc.). The base can be used undiluted or diluted with inert solvents, for example, hydrocarbons such as benzene, toluene, xylene, etc., and halocarbons such as chloroform, chlorobenzene, methylene, chloride, etc. Tertiary amines are advantageous in that they serve to catalyze the reaction, are good solvents, and act as acceptors for halogen acid given off during the reaction.

Although the phosgene reaction can be carried out over a wide range of temperatures, for example, from below 0° C. to over 100° C., the reaction proceeds satisfactorily at 25° C. to 50° C. Since the reaction is exothermic, the rate of phosgene addition can be used to control the reaction temperature. Substantially equimolar amounts of phosgene can be used, although an excess of up to 1.5 moles or more may be employed.

Suitable phosgene-like dibasic acid halides, in addition to phosgene, include, for example, dibromo and diiodocarbonyls as well as the bishaloformates of dihydric phenols (e.g., bischloroformates of hydroquinone, bisphenol-A, etc.) or glycols (e.g., bischloroformates of ethylene glycol, neopentyl glycol, polyethylene glycol, etc.). Other carbonate precursors will occur to those skilled in the art.

It will be seen that whether a carbonate ester or phosgene is used in the reaction, the dihydric phenol will produce a dihydric phenol carbonate structural unit which can typically be represented by the following general formula wherein the various letters have the same meaning as above:

(III)

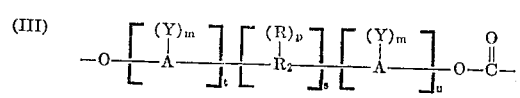

In addition to the polymers described above, copolymers containing carbonate units are also susceptible to treatment according to the present invention. Such copolymer compositions are described, for example, in copending application S.N. 638,239, filed February 5, 1957, assigned to the same assignee as this invention, which hereby is included by reference as a part of this application. Other materials susceptible to similar treatment are polycarbonate copolymers of dihydric phenols and sulfones as described in copending application S.N.

679,745, filed August 22, 1957, copolymers of dihydric phenols and aromatic ethers as disclosed in copending application S.N. 679,746, filed August 22, 1957, and copolymers of dihydric phenols and dibasic acids as disclosed in copending application S.N. 679,743, filed August 22, 1957, all of the above copending applications being assigned to the same assignee as this invention and being incorporated herein by reference.

Any of the usual well-known liquid or gum-like organopolysiloxanes may be used in connection with this invention. Such organopolysiloxanes may be prepared, for example, by the hydrolysis of hydrolyzable aliphatic-substituted silanes, such as dialiphatic dihalosilanes, for example, dimethyldichlorosilane, followed by complete or partial condensation of the hydrolysis product. They may also be prepared, for example, by hydrolyzing mixtures of hydrolyzable diorgano-substituted silanes either among themselves or with hydrolyzable silanes containing, for example, three organic radicals substituted on the silicon atom, for insance, trimethylchlorosilane.

A further method for preparing the organo-substituted polysiloxanes comprises hydrolyzing a diorgano-substituted dihalosilane, isolating the hydrolysis product and effecting reaction between the hydrolyzed product and, e.g., hexamethyl disiloxane in the presence of sulfuric acid. More specific directions for the hydrolysis of hydrolyzable organo-substituted silanes to form organo-substituted polysiloxanes may be found, for example, in patents and in the literature now available in the art.

By the term "hydrolyzable organo-substituted silanes" it is intended to mean derivatives of $SiH_4$ which contain hydrolyzable groups or radicals, for example, halogens, amino groups, alkoxy, aryloxy, acyloxy radicals, etc., in addition to the organic groups substituted directly on the silicon atom that are joined to the silicon through carbon-silicon linkages. Examples of such organic radicals are aliphatic radicals including alkyl radicals, for example, methyl, ethyl, propyl, isopropyl, butyl, etc.; alicyclic radicals, for example, cyclopentayl, cyclohexyl, etc.; aryl radicals, for example, phenyl, diphenyl, naphthyl, anthracyl, etc.; aralkyl radicals, for example, benzyl phenylethyl, etc.; alkaryl radicals, for example, tolyl, xylyl, etc.; heterocyclic radicals, etc.; as well as hydrolyzable silanes containing two different organic radicals, for example, methyl and phenyl radicals, etc.; attached to the silicon atom. If desired, the above-mentioned radicals may also contain substitutents substituted thereon, for instance, halogens, e.g., di-, tri-, tetra-chlorophenylchlorosilanes, for example, trichlorophenyltrichlorosilane, tetrachlorophenyltrichlorosilane, etc. The trihalosilanes, of course, act as chain stoppers.

Hydrolysis of the above silanes or mixtures of silanes results in the formulation of silanols, i.e., organo-substituted silanes containing hydroxy groups substituted directly on the silicon, which hydroxy groups almost immediately condens intermolecularly (intercondense) splitting out water to give the siloxane linkages mentioned previously. Such intercondensations are accelerated by acidic materials, for example, sulfuric acid, hydrochloric acid, ferric chloride, etc., as well as by basic materials, for example, sodium hydroxide, potassium hydroxide, etc. As a result of the hydrolysis and condensation, organo-substituted polysiloxanes may be produced which are partially or completely condensed and which may have on the average up to as high as three organic radicals subtsituted per silicon atom, but preferably from 1.98 to 2.25 organic groups per silicon atom. The liquid organopolysiloxanes prepared in this manner consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as the hydrolyzable radicals listed previously.

Other directions for preparing the organopolysiloxane compositions employed in the practice of the present invention may be found disclosed and claimed in Patnode Patents 2,469,888 and 2,469,890, issued May 10, 1949; Burkhard Patent 2,689,859, issued September 21, 1954, the latter three patents being assigned to the same assignee of the present invention, as well as in Fletcher et al. Patent 2,599,844, issued June 10, 1952.

Organopolysiloxane gums are also useful in connection with the invention. These are highly viscous masses or gummy elastic solids depending on the state of condensation, the condensing agent employed, and the starting organopolysiloxane used to make the gummy material. A typical gummy organopolysiloxane is obtained by the condensation of a liquid organopolysiloxane containing an average of from about 1.95, preferably from about 1.98 to about 2.05, organic groups per silicon atom. The usual condensing agents which may be employed and which are well known in the art include, for instance, ferric chloride hexahydrate, phenyl phosphoryl chloride, alkaline condensing agents such as potassium hydroxide, sodium hydroxide, etc. These convertible organopolysiloxanes generally contain polymeric diorganopolysiloxanes which may contain, for example, about 2 mole percent copolymerized mono-organopolysiloxane, for example, copolymerized monomethylsiloxane. Generally, the starting liquid organopolysiloxane is one which contains 1.999 to 2.01, inclusive, organic groups, for example, methyl groups, per silicon atom and where more than about 90 percent, preferably 95 percent, of the silicon atoms in the polysiloxane contain two silicon-bonded alkyl groups. A typical useful gum is prepared by mixing together about 95 mole percent octamethylcyclotetrasiloxane, and about 5 mole percent octaphenylcyclotetrasiloxane, at a temperature from about 150° C. to 175° C. for about 4 hours with about 0.01 percent potassium hydroxide based on the weight of the siloxane, until a highly viscous gummy solid is obtained. Generally, the amount of octaphenylcyclotetrasiloxane can be varied up to about 20 mole percent of the total mixture for the purpose of the invention.

Attention is directed to the convertible organopolysiloxane disclosed in Agens Patent 2,448,756; Sprung et al. Patent 2,448,556; Sprung Patent 2,484,575; Krieble et al. Patent 2,457,688; Hyde Patent 2,490,357; Marsden Patent 2,521,528; and Warrick Patent 2,541,137, all of which are included herein by reference.

The present invention involves polycarbonate-polysiloxane compositions having enhanced properties. These compositions are prepared by the intimate mixing of the polycarbonate material and organopolysiloxane, the amount of organopolysiloxane varying from about 0.1 percent to about 20 percent based on the weight of the polycarbonate polymer and preferably from about 1 percent to about 10 percent. The mixing of materials can be accomplished by a variety of methods normally employed for incorporation of plasticizers or fillers into thermoplastic polymers including but not limited to mixing rolls, doughmixers, Banbury mixers, extruders, and other mixing equipment. The addition of the organopolysiloxane normally reduces the viscosity of the melt, making for a more complete and rapid dispersion of the materials one in the other. Melt blending of the materials can be employed and is advantageously carried out under an inert atmosphere or vacuum where indicated. The resulting polycarbonate-organopolysiloxane compositions may, after mixing, be handled in any conventional manner employed for the fabrication or manipulation of thermoplastic resins. The materials may be cast or molded using compression, injection, calendering and extrusion techniques. As mentioned heretofore, the organopolysiloxane may also be incorporated into the ester exchange reaction mixture where a melt blending is indicated. The organopolysiloxane can also be incorporated with the polycarbonate material by techniques involving mixing, tumbling or spraying of the solid polycarbonate prior to extrusion or other fabrication process which in itself provides the mixing action. Solution techniques may also be employed where the siloxane is added to a polycarbonate resin dissolved in a solvent such as methylene chloride, dioxane, cyclohexanone or chloroform and thoroughly dispersed prior to casting or precipitation of the polycarbonate-siloxane mixture. The polysiloxane may also be dispersed or dissolved in the reaction mixture during the preparation of the polycarbonate by solution techniques. Known non-solvents such as aliphatic alcohols, e.g., methanol, ethanol, butanol, etc., or aliphatic hydrocarbons, e.g., hexane, petroleum ether, etc., are useful in precipitating the compositions from solution.

Incorporation of the siloxane into the polycarbonate system enhances many of the physical and chemical properties of the polycarbonate resin. Notably there is an improvement in the release characteristics of the material from metal and ceramic surfaces, a reduction in melt viscosity which enables fabrication at lower temperatures and lower molding pressures, improved ductility and toughness, greater resistance to wetting and hydrolytic degradation and development of an opaque or milky white appearance which is esthetically pleasing and which is useful in masking the normally transparent appearance of the polycarbonate where this is desirable.

The following examples will illustrate the practice of this invention and are to be taken as illustrative thereof rather than as limiting.

EXAMPLE 1

A reactor was charged with 274 grams (1.2 moles) of bis-phenol-A, and 295 grams (1.38 moles) (15 percent excess) of diphenyl carbonate. The mixture was heated with stirring at a pressure of 10 mm. of mercury and at 173° C. for 1.5 hours, at which point phenol distillation began. The mixture was further heated for 5 hours at the same temperature and pressure, at which point the pressure was reduced to 0.07 mm. of mercury and the temperature raised to 263° C. Further polymerization was accomplished by vacuum cooking at 260 to 265° C. at 0.06 to 0.08 mm. for 7.5 hours. The resinous product was dissolved in dioxane and precipitated with methanol. The intrinsic viscosity of the material was 0.8, measured in dioxane at 30.3° C.

About 3 to 4 grams of the above clear polymer was allowed to soften on a 230° C. hotplate and a few drops of a dimethylpolysiloxane fluid chain-stopped with trimethylsilyl groups and having a viscosity of 300 centistokes at 100° F. were added thereto, with mixing. As the resin absorbed the oil, it became more pliable and assumed a milky-opaque appearance, which was homogenous after several minutes of mixing. The resultant product was compression-molded at 190° C. into a 60-mil thick disk which was tough and opaque. Particularly noticeable was the ease with which the piece released from the mold, there being no adhesion whatsoever of the resin to the metal.

EXAMPLE 2

A polycarbonate material was prepared by adding to a reaction vessel 300 lbs. of pyridine and 30 lbs. of bisphenol-A. Phosgene in the amount of 14.5 lbs. was admitted to the reaction fluid by bubbling at rates varying from 30 cu. ft. per hour to 10 cu. ft. per hour with stirring at a temperature of from about 25° C. to 35° C. The resultant polycarbonate resin was precipitated with isopropanol, washed and filtered by centrifuging.

To each of four solutions consisting of 2.8 grams of the above polycarbonate material (having an intrinsic viscosity in dioxane of 1.3 at 30.4° C.) in 40 cc. of chloroform, there were added weighed amounts of a dimethylpolysiloxane fluid as described above. The weights and percentages of polysiloxanes added are shown in Table I below.

Table I

| Sample | Polysiloxane (grams) | Wt. Percent Polysiloxane (based on polycarbonate) |
| --- | --- | --- |
| 1 | 0.00 | 0.0 |
| 2 | 0.02 | 0.7 |
| 3 | 0.04 | 1.4 |
| 4 | 0.10 | 3.6 |
| 5 | 0.20 | 7.2 |

From each of the above solutions there was cast a 4" x 6" film, and a control film of the original polycarbonate material itself without any additive (Sample 1) was also cast, all films being dried at room temperature for about 7.5 hours, and at 85° C. for 16 hours in an air circulating oven. Whereas the polycarbonate film itself was clear and transparent, the silicone-containing films were milky to opaque in color. The opacity varied directly with the silicone concentration. There was no bleeding of the silicone, indicating that it was intimately incorporated into the resin. These films were used for the following tests.

The tensile strength of the organopolysiloxane treated polycarbonate material was tested at 25° C. according to ASTM Test D882-49T, the test specimen about 7 mils thick, ½" wide, being drawn at a speed of 2 inches per minute using an Instron tester. The results of such tensile strength testing are shown in Table II below.

Table II

| Sample | Percent Polysiloxane | Yield (p.s.i.) | Ultimate (p.s.i.) | Elongation, Percent |
| --- | --- | --- | --- | --- |
| 1 | 0 | 7,250 | 7,245 | 21 |
| 2 | 0.7 | 9,100 | 7,800 | 56 |
| 3 | 1.4 | 8,840 | 8,160 | 42 |
| 4 | 3.6 | 8,330 | 7,975 | 55 |
| 5 | 7.2 | 7,590 | 6,845 | 76 |

From the above Table II, it will be seen that the physical characteristics of the original polycarbonate material are definitely improved with the addition of the organopolysiloxane material, and particularly so with respect to the percent elongation.

The 6 to 7 mil thick films of varying polysiloxane content were cut into ¼ inch wide strips and flexed repeatedly by folding and pressing the resultant crease. Folding was continued until the sample showed cracking or breaks at least ⅛ inch long, flex life being considered to be the number of folds required to cause failure. The results of this test are given in Table III below, each value being the average of at least six tests per sample.

Table III

| Sample | Percent Polysiloxane | Flex Life |
| --- | --- | --- |
| 1 | 0 | 39 |
| 3 | 1.4 | 45 |
| 4 | 3.6 | 39 |
| 5 | 7.2 | 74 |

From the above table, it will be noted that there is about a two-fold increase in flex life for the material to which 7.2 percent of the silicone had been added.

The melt-flow behavior or melt viscosity of the above materials was tested by pressing a 30-mil thickness of resin made up of a laminate 6–7 mil thicknesses of the polymer between glass plates on a hot block melting point apparatus, a 500 g. weight supplying pressure to a 10 mm. glass tube ram. The sample temperature was raised at the rate of about 2–3° C./min. from 150° C. and the temperature at which the sample flowed to a 10 mm. diameter was taken as the plastic flow temperature. The results of this test with the various samples are shown in Table IV below.

Table IV

| Sample | Percent Polysiloxane | Plastic Temperature ° C. |
|---|---|---|
| 1 | 0 | 268 |
| 3 | 1.4 | 270 |
| 4 | 3.6 | 253 |
| 5 | 7.2 | 254 |

From the above table, it will be noted that the addition of larger amounts of silicone materials resulted in a decrease in flow temperature of about 15° C.

The resistance of the various materials of the invention to basic hydrolysis was tested by immersing 6 to 7 mil thick films weighing about 0.15 g. in 10 percent aqueous sodium hydroxide at room temperature, the weight loss being determined after the times indicated in Table V below.

Table V

| Sample | Percent Polysiloxane | Percent Weight Loss | | | |
|---|---|---|---|---|---|
| | | 1 Day | 2 Days | 5 Days | 7 Days |
| 1 | 0 | 0.37 | 0.73 | 1.76 | 1.84 |
| 3 | 1.4 | 0.11 | 0.27 | 1.20 | 1.53 |
| 4 | 3.6 | 0.28 | 0.33 | 1.22 | 1.27 |
| 5 | 7.2 | 0.29 | 0.41 | 1.41 | 1.46 |

From the above table, it will be noted that the addition of organopolysiloxane material to the polycarbonate material definitely improves the resistance to basic hydrolysis.

There are provided by this invention polycarbonate materials which, by means of the addition of organopolysiloxane, may be made inherently more easily releasable from molds. The more desirable tensile strength characteristics of the new materials permit their application for uses which were previously prohibited by the poorer physical characteristics of the unmodified material. In line with the physical strength improvements of the material is the increase in flex life, which is useful where the material is subjected to repeated folding or flexing. By the invention, polycarbonate materials which are tan or brown may be produced in a white or ivory color. Furthermore, if opaque material is desired, clear polycarbonate materials may be so treated in order to make them opaque.

The materials can be used in molding powder formulations either alone or in combination with fillers, such as woodflour, diatomaceous earth, silica, carbon black, etc. to make molded parts of varied shapes. They are useful for preparing gaskets, tubing and other materials which are resistant to chemicals and oil.

Films of the polycarbonate-polysiloxane composition prepared in conventional ways are useful as wrapping or packaging materials, as metal or fiber liners, containers, covers, closures, electrical insulating tapes, sound recording tapes, pipe coverings, etc.

Films and fibers of the material can be beneficially oriented or drawn at elevated temperatures, such as from 50° C.–200° C. In many cases the tensile strength of the compositions can be more than doubled by cold drawing. The fiber form of the material can be used for yarn, thread, bristles, rope, etc. and is readily dyed.

Because of their properties, the polycabonate-polysiloxane compositions can be used as surface coverings for appliances and the like or as coatings for rods and wire, as slot insulation in dynamoelectric machines and as bonding material for parts or laminates and in adhesive formulations. They are also efficacious in wire enamels, varnishes and paints and can be readily mixed with pigments, stabilizers, plasticizers, etc. The compositions of the invention can also be alloyed with other resinous materials.

What I claim as new and desire to secure by Letters Patent of the United States is:

1. A resinous mixture comprising, by weight, from about 0.1% to 20% organopolysiloxane and a polymer of a carbonate of a dihydric phenol in which the carbonate group is attached directly to a carbon atom of an aromatic ring, the weight of said organopolysiloxane being based on the weight of the carbonate polymer.

2. An electrical insulating material comprising a mixture of (1) from about 0.1% to 20% by weight organopolysiloxane and (2) a polymer of a carbonate of a dihydric phenol in which the carbonate group is attached directly to a carbon atom of an aromatic ring, the weight of said organopolysiloxane being based on the weight of the carbonate polymer.

3. A fibrous material comprising a mixture of (1) from about 0.1% to 20% by weight organopolysiloxane and (2) a polymer of a carbonate of a dihydric phenol in which the carbonate group is attached directly to a carbon atom of an aromatic ring, the weight of said organopolysiloxane being based on the weight of the carbonate polymer.

4. A film comprising a mixture of (1) from about 0.1% to 20% by weight organopolysiloxane and (2) a polymer of a carbonate of a dihydric phenol in which the carbonate group is attached directly to a carbon atom of an aromatic ring, the weight of said organopolysiloxane being based on the weight of the carbonate polymer.

5. An electrical conductor coated with an insulating material comprising a mixture of (1) from about 0.1% to 20% by weight organopolysiloxane and (2) a polymer of a carbonate of a dihydric phenol in which the carbonate group is attached directly to a carbon atom of an aromatic ring, the weight of said organopolysiloxane being based on the weight of the carbonate polymer.

6. A molded structure comprising a mixture of (1) from about 0.1% to 20% by weight organopolysiloxane and (2) a polymer of a carbonate of a dihydric phenol in which the carbonate group is attached directly to a carbon atom of an aromatic ring, the weight of said organopolysiloxane being based on the weight of the carbonate polymer.

7. A laminated structure comprising laminae and a resinous material comprising a mixture of (1) from about 0.1% to 20% by weight organopolysiloxane and (2) a polymer of a carbonate of a dihydric phenol in which the carbonate group is attached directly to a carbon atom of an aromatic ring, the weight of said organopolysiloxane being based on the weight of the carbonate polymer.

References Cited in the file of this patent

UNITED STATES PATENTS

| 2,874,046 | Klockgether et al. | Feb. 17, 1959 |
| 2,877,202 | Olson | Mar. 10, 1959 |

FOREIGN PATENTS

| 730,599 | Great Britain | May 25, 1955 |